(12) United States Patent
Nix

(10) Patent No.: US 6,724,187 B2
(45) Date of Patent: Apr. 20, 2004

(54) METHODS FOR ELIMINATING ERROR SOURCES OF MAGNETIC SENSORS USED FOR THE MEASUREMENT OF COATING THICKNESS

(75) Inventor: Norbert Nix, Köln (DE)

(73) Assignee: Automation Hans Nix GmbH, Cologne (DE)

( * ) Notice: Subject to any disclaimer, the term of this patent is extended or adjusted under 35 U.S.C. 154(b) by 98 days.

(21) Appl. No.: 10/087,216

(22) Filed: Mar. 4, 2002

(65) Prior Publication Data

US 2002/0163332 A1 Nov. 7, 2002

(51) Int. Cl.⁷ .............................. G01B 7/06; G01R 33/12
(52) U.S. Cl. ................... 324/230; 324/225; 324/232
(58) Field of Search ..................... 324/207.12, 225, 324/227, 229–232, 235, 251; 33/708, 834; 702/97

(56) References Cited

U.S. PATENT DOCUMENTS

| | | | | |
|---|---|---|---|---|
| 3,359,495 A | * | 12/1967 | McMaster et al. | 324/235 |
| 4,695,797 A | * | 9/1987 | Deutsch et al. | 324/230 |
| 5,343,146 A | * | 8/1994 | Koch et al. | 324/230 |
| 5,977,766 A | * | 11/1999 | Linder et al. | 324/225 |
| 6,150,810 A | * | 11/2000 | Roybal | 324/227 X |
| 6,504,363 B1 | * | 1/2003 | Dogaru et al. | 324/235 |

* cited by examiner

Primary Examiner—Gerard R. Strecker

(57) ABSTRACT

A method which compensates errors resulting from offset voltages and external magnetic fields when a magnetic sensor is used to measure coating thickness. The method also allows compensation of a temperature dependent change for output voltages of the magnetic sensor.

8 Claims, 1 Drawing Sheet

METHODS FOR ELIMINATING ERROR SOURCES OF MAGNETIC SENSORS USED FOR THE MEASUREMENT OF COATING THICKNESS

FIELD OF THE INVENTION

The invention relates to a method to measure non-magnetic coatings on ferro-magnetic substrates, using a magnetic sensor, where errors due to offset voltage of the magnetic sensor, temperature dependence of the sensor parameters and disturbing magnetic fields are compensated.

DESCRIPTION OF THE PRIOR ART

Patent EP0028487 discloses a measuring device that uses a Hall-sensor together with a permanent magnet. In this device the flux of external magnetic fields is superimposed to the flux of the internal permanent magnet and can not be separated. Therefore the change of the output signal of the Hall-sensor due to these external fields can not be determined. This results in erroneous measurements.

Pat. DE19910411 discloses a method for offset compensation of Hall-sensors. This method eliminates the offset by applying two different currents to the Hall-sensor, measuring the Hall-voltage at each current and calculating the offset from these two measured voltages. However this method does not allow for compensation of external magnetic fields.

In U.S. Pat. No. 3,359,495, a device is described that has a Hall-sensor with a coil arranged around the Hall-sensor. This device uses alternating electromagnetic fields generating eddy currents in the substrate. These eddy currents strongly depend on the conductivity of the substrate. The eddy currents in turn generate a secondary magnetic field opposed and superimposed to the primary field. This results in a change of the output voltage of the Hall-sensor. Since the strength of the eddy currents and consequently the strength of the secondary magnetic field strongly depend on the conductivity, this has a negative influence on the measuring results. An additional error occurs when the substrate is covered with a conductive coating. Also, in the conductive coating eddy currents are generated. They have the same effect on the flux through the Hall-sensor as those generated in the substrate.

SUMMARY OF THE INVENTION

It is an object of the invention to provide simple methods which allow to eliminate the different error sources when using magnetic sensors for the measurement of coating thickness.

With the first two methods the influence of external magnetic fields, as they can be present in mechanically or thermally treated substrates, or of time varying fields on the measuring device can be eliminated. Additionally this invention makes use of the advantages of the static magnetic field being insensitive to the conductivity of substrate and metal coatings.

A further advantage of this method is the automatic compensation of the temperature dependent offset voltage of magnetic sensors. This offset voltage occurs when applying a current to the sensor, even in the absence of a magnetic field.

A further described method of this invention can be used to compensate the influence of temperature on the signal voltage.

DETAILED DESCRIPTION OF THE PREFERRED EMBODIMENT

Figure 1:
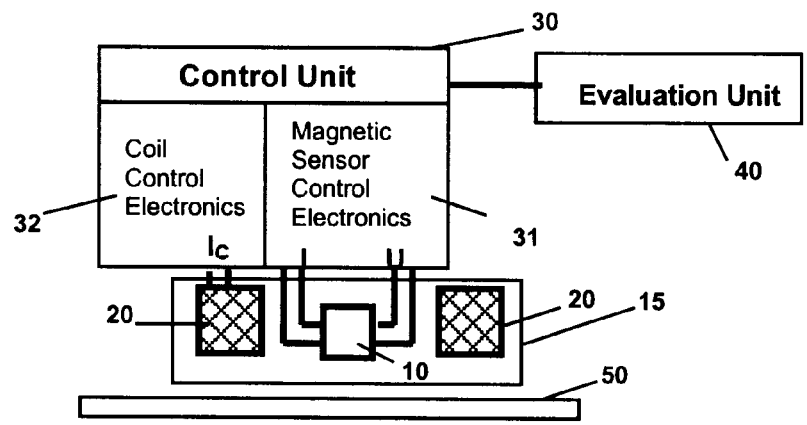
FIG. 1 is a block diagram of the measuring device.
Figure 2:
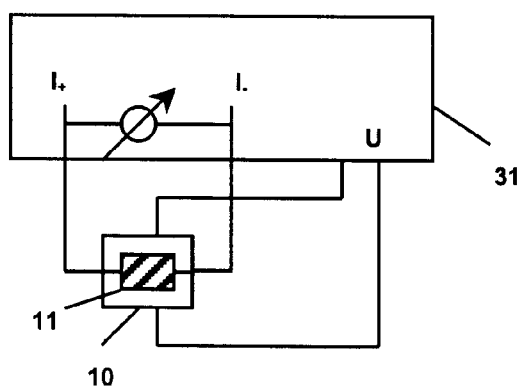
FIG. 2 is a circuitry block diagram of the magnetic sensor for compensation of the temperature dependence of the signal voltage.

The measuring device is equipped with a magnetic sensor 10 (e.g., Hall-sensor or GMR-sensor element) and a coil 20 which is disposed near the sensor. The control unit 30 contains the sensor electronics 31 to feed the magnetic sensor 10 with a current I and to receive the signal voltage U. The control unit 30 also contains the coil control unit 32 to feed the current Ic through the coil 20.

The compensation of external magnetic fields as well as the offset voltage of the magnetic sensor 10 can be performed by either of the methods described as preferred embodiments hereafter.

With the first method the output voltage U in the magnetic sensor 10 is measured first by the magnetic sensor control unit 31 without a current $I_C$ through the coil 20, when the measuring probe 15 is placed on the object under test 50. The output voltage U depends on the external magnetic field $B_{EXT}$ through the magnetic sensor 10. This output voltage $U_1$ is transferred from the control unit 30 to the evaluation unit 40. There it is digitized and stored. With the next step a current $I_C$ is fed through the coil 20. This current generates a magnetic field B that is superimposed to the external magnetic field $B_{EXT}$. This creates a different magnetic flux thorough the magnetic sensor 10 and consequently a different output voltage $U_2$. This voltage $U_2$ is transferred from the control unit 30 to the evaluation unit 40. There it is digitized and stored. A linear relation exists between output voltage U and magnetic flux B through the magnetic sensor which can be written in the following form:

$$U=U_0+K\cdot B\cdot I \tag{1}$$

$U_0$ is the offset voltage, K is the sensor constant and I is the current through the magnetic sensor 10. Equation 1 immediately shows that the output voltage is the sum of the offset voltage and the sum of all magnetic flux components $B_a$, $B_b$, ... through the magnetic sensor 10:

$$U=U_0+U_a+U_b+\ldots =U_0+K\cdot(B_a+B_b+\ldots)\cdot I \tag{2}$$

Therefore in the evaluation unit 40 the following difference can be calculated:

$$U_{res}=(U_2-U_1)=[U_0+K\cdot(B+B_{ext})\cdot I]-[U_0+K\cdot B_{ext}\cdot I]=K\cdot B\cdot I \tag{3}$$

The result $U_{res}$ represents the voltage the magnetic sensor would generate if no external magnetic field were present. Simultaneously the offset voltage $U_0$ is eliminated. Using the functional relation between output voltage U of the magnetic sensor 10 and the distance of the sensor from the substrate (=coating thickness d=f(U)) the true coating thickness d can be calculated from the result $U_{res}$.

With the second method a certain current $I_{c1}$ is fed through the coil 20 by the coil control unit 32 when the measuring probe is placed on the object under test. The magnetic field $B_1$ generated by this current, together with an external magnetic field $B_{ext}$, generates a magnetic flux through the magnetic sensor 10, resulting in an output voltage.

$$U_1=U_0+K\cdot(B_1+B_{ext})\cdot I \tag{4}$$

This output voltage $U_1$ is transferred from the control unit 30 to the evaluation unit 40. There it is digitized and stored.

With the next step a second current $I_{C2}$ is fed through the coil 20. In a preferred embodiment the current is selected as $I_{C2}=I_{C1}$. The absolute value of the magnetic field $B_2$, together with the external magnetic field $B_{EXT}$, generates a magnetic flux through the magnetic sensor 10, resulting in an output voltage:

$$U_2=U_0+K\cdot(B_2+B_{ext})\cdot I=U_0+K\cdot(-B_1+B_{EXT})\cdot I \quad (5)$$

This output voltage $U_2$ is transferred from the control unit 30 to the evaluation unit 40. There it is digitized and stored. Using equation 2 and the two digitized output voltages $U_1$ and $U_2$, the voltage resulting from the external magnetic field $B_{ext}$ and the offset voltage $U_0$ can be eliminated as follows:

$$U_{RES}=[U_1-U_2]=K\cdot[(B_1+B_{EXT})-(B_2+B_{EXT})]\cdot I = K\cdot[B_1-B_2]\cdot I \quad (6)$$

Because of $B_2=-B_1=B$ equation 6 can be rewritten as:

$$U_{res}=2\cdot K\cdot B\cdot I \quad (7)$$

Using the functional relation between output voltage U of the magnetic sensor 10 and the distance of the sensor from the substrate (=coating thickness d=f(U)) the true coating thickness d can be calculated from the result $U_{res}$.

In a preferred embodiment the influence of time varying magnetic fields, which usually have typical frequencies such as 60 Hz (e.g. those generated by transformers), can be eliminated by repeated changes between those two currents $I_{C1}$ and $I_{C2}$. The resulting output voltage is determined using the following equation:

$$\begin{aligned}U_{res} &= \{[U_1-U_2]_1+[U_1-U_2]_2+\ldots+[U_1-U_2]_N\}/N \\ &= K\cdot\{[(B_1+B_{ext1})-(B_2+B_{ext2})]_1+[(B_1+B_{ext1})-\\ &\quad (B_2+B_{ext2})]_2+\ldots+[(B_1+B_{ext1})-(B_2+B_{ext2})]_N\}/N\cdot I \\ &= 2\cdot K\cdot[B+\{(B_{ext1}-B_{ext2})_1+(B_{ext1}-B_{ext2})_2+\ldots+\\ &\quad (B_{ext1}-B_{ext2})_{1N}\}/N]\cdot I\end{aligned} \quad (8)$$

with N being the number of repetitions. Those components of external magnetic fields in curved brackets will be averaged to zero, especially when the N pairs of measurements are taken in an interval that which is equal to one or several periods of the time varying magnetic field.

A further method in accordance with this invention allows to compensate the temperature dependence of the output voltage U. The temperature in the magnetic sensor 10 or the temperature change with respect to a reference temperature can be determined by measuring the internal resistance 11 of the magnetic sensor 10. This can be used to determine a compensation factor to correct the output voltage for temperature changes.

Starting from equation 1 the temperature gradient of the output voltage can be calculated as follows (a change in offset voltage can be neglected as effect of second order):

$$dU/dt=B\cdot[dK_H/dT\cdot I+K\cdot dI/dT]=B\cdot K\cdot I\cdot[\alpha+\beta] \quad (9)$$

using the following abbreviations:

$$dK/dT=K(T_0)\cdot\alpha, \quad dI/dT=I(T_0)\cdot\beta$$

$K(T_0)$ und $I(T_0)$ are related to reference temperature $T_0$.

$\alpha$ and $\beta$ are the temperature coefficients of the output voltage U and the sensor resistance 11 respectively. Since the coefficients $\alpha$ and $\beta$ are known for each individual type of magnetic sensor, these parameters can be implemented directly in the control unit or used as parameters in a digital control unit.

The temperature dependant output voltage can be determined using the following equation:

$$U(T)=U(T_0)+dU/dT\cdot(T-T_0)=B\cdot K(T_0)\cdot I(T_0)\cdot\{1+[\alpha+\beta]\cdot(T-T_0)\} \quad (10)$$

Equation 10 shows that the output voltage, measured at a temperature T, needs to be corrected by a factor $\{1+[\alpha+\beta]\cdot(T-T_0)\}$ as given in equation 10, in order to reduce the output voltage to the correct value at reference temperature $T_0$. To do so the evaluation unit 40 has to calculate the factor in curved brackets which is transferred via the control unit 30 to the control of the magnetic sensor 31 to adjust the current I through the magnetic sensor by this factor.

To determine the temperature T the voltage drop across the sensor resistance 11 is measured by the sensor control unit 31 by feeding a constant current through this resistance 11. First this is done at temperature $T_0$ as a reference, and then at each measurement of the output voltage U. To calculate the actual temperature T or the temperature deviation $\Delta T$ from the reference temperature $T_0$ the following equation is used:

$$R(T)=R(T_0)\cdot[1+\beta\cdot(T-T_0)]=R(T_0)\cdot[1+\beta\cdot\Delta T] \quad (11)$$

$\beta$ is the temperature coefficient of the sensor resistance 11 given above.

Then the temperature difference relative to $T_0$ is calculated as:

$$\Delta T=(1/\beta)\cdot R(T)/R(T_0) \quad (12)$$

The procedure to determine a temperature compensated coating thickness is as follows:

First with a reference measurement the sensor resistance $R(T_0)$ is determined in the control unit 30. This value is digitized and stored in the evaluation unit 40. Each time a coating thickness measurement is taken, the value R(T) is determined first, transferred from the control unit 30 to the evaluation unit 40, where it is digitized and stored. This value is then used to calculate the temperature difference $\Delta T$ according to equation 12. Subsequently, using $\Delta T$, the correction factor $\{1+[\alpha+\beta]\cdot(T-T_0)\}$ is calculated in the evaluation unit 40 and transferred to the control unit 30. Then this parameter is used in the magnetic sensor control unit 31 to adjust the current I such that the output voltage conforms to the respective voltage at reference temperature $T_0$.

Alternatively to adjusting the current I through the resistor 11 of the magnetic sensor 10 upon temperature change the correction of the output voltage U at the measured temperature T can also be done digitally in the evaluation unit 40 using equation 10 and 12.

Of course it is obvious for a person skilled in the art to combine the method for temperature compensation of the output voltage with one of the methods for compensation of external magnetic fields.

What is claimed is:

1. A method for determining the thickness of a coating on a ferro-magnetic substrate using a device having a magnetic sensor element and a coil, the method comprising the steps:

placing the device on the coated ferro-magnetic substrate;

measuring a first output voltage of the magnetic sensor element generated by an external disturbing magnetic field incident on the magnetic sensor element; and generating a magnetic field by applying a direct current to the coil and measuring a second output voltage of the magnetic sensor elements; wherein the first voltage measured in the first step is subtracted from the second voltage measured in the second steps; to yield a difference, and the difference is used to determine the thickness of the coating on the ferro-magnetic substrate.

2. A method for determining the thickness of a coating on a ferro-magnetic substrate using a device having a magnetic sensor element and a coil, the method comprising the steps:

placing the device on the coated ferro-magnetic substrate;

generating a first output voltage $U_1$ in the magnetic sensor element by a magnetic field $B_1$, which is generated by a first current $l_1$ in the coil, the first output voltage being dependent on the distance of the magnetic sensor element from the ferro-magnetic substrates, and on external disturbing magnetic field incident on the magnetic sensor element, wherein a control unit determines the first output voltage of the magnetic sensor element generated in the first generating step;

a second current $I_2$ passing through the coil and a resulting magnetic field $B_2$ generates a second output voltage $U_2$;

the control unit determines the second output voltage of the magnetic sensor element generated in the second generating step; and an evaluation unit determines the coating thickness from a difference in the first and second output voltages.

3. The method of claim 2, wherein the first current $I_1$ is of a same absolute value as the second current $I_2$, but with opposite polarity.

4. The method of claim 2, wherein the steps of generating and determining are repeated several times.

5. The method of claim 1 or 2, wherein the magnetic sensor element is a Hall-sensor element.

6. The method of claim 1 or 2, wherein the magnetic sensor element is a GMR-sensor element.

7. The method of claim 1, wherein the measurement of the output voltage is corrected by calculation, adjustment of the direct current through the resistance of the magnetic sensor element, or usage of a temperature signal with temperature coefficients of the magnetic sensor element calculation to determine a factor.

8. The method of claim 2, wherein the measurement of the output voltage is corrected by calculation, adjustment of the first current through the resistance of the magnetic sensor element, or usage of a temperature signal with temperature coefficients of the magnetic sensor element calculation to determine a factor.

* * * * *

UNITED STATES PATENT AND TRADEMARK OFFICE
CERTIFICATE OF CORRECTION

PATENT NO. : 6,724,187 B2
APPLICATION NO. : 10/087216
DATED : April 20, 2004
INVENTOR(S) : Norbert Nix It is certified that error appears in the above-identified patent and that said Letters Patent is hereby corrected as shown below:

<u>TITLE PAGE</u> -

Insert the following:

Item -- [30] Foreign Application Priority Data

Mar. 10, 2001 (DE) ............................................. 101 11 624.1 --

Signed and Sealed this

Second Day of June, 2009

JOHN DOLL
*Acting Director of the United States Patent and Trademark Office*